United States Patent [19]

Sutherland et al.

[11] Patent Number: 4,999,140

[45] Date of Patent: Mar. 12, 1991

[54] DOMESTIC CARBONATOR

[76] Inventors: Albert J. Sutherland, 1 Kesteven Close, Hainault, Essex, England; Neil K. Sutherland, 25 Parliament St., Colborne, Ontario KDKISO, Canada, K0K 1S0

[21] Appl. No.: 250,365

[22] Filed: Sep. 28, 1988

[51] Int. Cl.[5] ........................ A23L 2/00; B01F 3/00

[52] U.S. Cl. ........................ 261/59; 99/323.1; 141/4; 141/18; 261/DIG. 7; 426/477

[58] Field of Search ............... 426/477, 397; 99/323.1; 261/59, DIG. 7; 141/4, 5, 18

[56] References Cited

U.S. PATENT DOCUMENTS 4,399,081 8/1983 Mabb .............................. 426/477
4,423,670 1/1984 Tenison .......................... 426/477

*Primary Examiner*—George Yeung
*Attorney, Agent, or Firm*—Smart & Biggar

[57] ABSTRACT

A domestic carbonator for gasifying liquid in a container comprising a cap for the container having an injector passage closed by a one-way non-return valve in combination with a main body having pressure-reducing discs, an injector piston for initiating a gas flow, a pressure relief valve and a pressure gauge. The main body is provided with an opening for receiving a $CO_2$ cylinder with a further piston for cutting off the gas supply under the effect of the back pressure from the container.

9 Claims, 4 Drawing Sheets

DOMESTIC CARBONATOR

Figure 1:
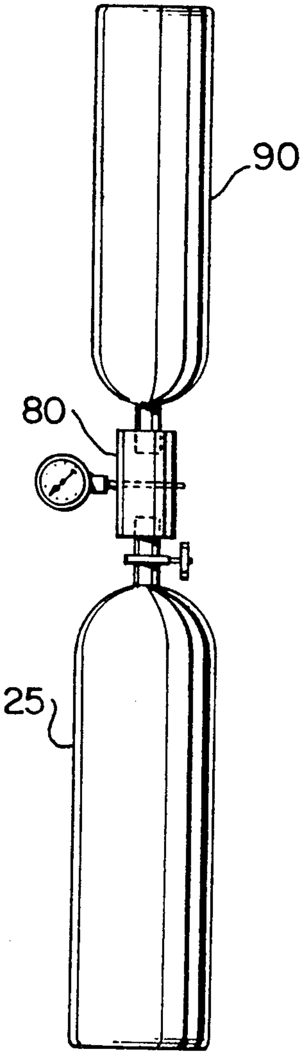

This invention relates to a small Domestic Carbonator and a simple process to obtain maximum results.

Wine and beer making are becoming increasingly popular with people who are looking for a hobby or pastime which produces a very enjoyable end product. Apart from wine and beer, a large number of mixer drinks are available, i.e. Rum and Cola, Gin and Tonic, etc.

After an alcoholic drink has been bottled from the fermenting vessel it may be conditioned as follows. Yeast and a small quantity of sugar are added. The purpose of this is restart fermentation for the sole purpose of producing $CO_2$ to carbonate the drink which is now in a sealed vessel to retain pressure. This fermentation takes from three to seven days, this is followed by a further period from two to three weeks for the yeast to settle and the drink to clear. After all this, a major problem still remains, the drink has to be handled with great care, and a quantity has to be thrown away with the sediment. It cannot travel, unless it is given a week or more to clear again.

Pouring has to be with considerable care, otherwise the sediment is brought up from the bottom and a large amount wasted. A further problem is often encountered through either under or over carbonation, this occurs when either too much or too little sugar has been added. This results in flat drinks or in over carbonation with the danger of glass bottles bursting, or the drink frothing over when it is poured, which in turn brings the sediment up form the bottom thus spoiling a large amount of drink.

Known domestic soft drink carbonators insert a $CO_2$ injector into water in a bottle and utilise post-mix carbonation—i.e. the syrup is added only after the water has been carbonated. This system suffers the drawback that carbonation is lost during mixing. These known carbonators could not be switched to a pre-mix system (wherein the syrup is mixed with the water prior to carbonation) as the frothing which inevitably occurs during carbonation would result in moisture exiting the pressure relief value of these systems via the airways. This syrup laden moisture could clog the airways as the syrup contains a high percentage of sugar which could crystallise in these narrow passageways.

With the present invention, fermented drinks can either be allowed to stand and clear, or can be filtered clear, then bottled, capped, and carbonated using low pressures. In this way, using the ready available P.E.T. bottles, the homebrewer would be able to enjoy his beverages at an earlier date, with none of the present disadvantages of unfiltered drinks with sediment problems. Further, with the present invention, soft drinks may be made using premix carbonation. In result, users are able to bring their homebrewing and soft-drink making more in line with the commercial products.

The P.E.T. bottles are capable of withstanding pressures far in excess of their tested levels of 90 p.s.i. for the one liter and 120 p.s.i. for the two liter bottles. Beers are normally carbonated to upwards to two and a half volumes, and soft drinks, three and a half to four volumes, 10 to 25 p.s.i. and 35 to 45 p.s.i., approximately, depending on the temperature of the liquid at the time of bottling.

The tread on the P.E.T. bottle is standard to P.E.T. bottles only, it is not possible to sue caps that fit other types of bottles to close P.E.T. bottles. P.E.T. is the trade term for plastic bottles manufactured from polyethylene and terephthalate.

According to the present invention, there is provided apparatus for gasifying liquid in a container comprising a cap for said container having an injector passage closed by a one-way non-return valve in combination with a body having means for mounting a cylinder of pressurized gas of the type having a flow control valve for supplying a flow of gas at supply pressure, said body having reduction means for receiving the gas from said cylinder, a passageway connecting said reduction means to an outlet configured for mating engagement with said injector passage of said cap, a control valve means comprising an injector piston incorporating said outlet and moveable between a non-depressed position and a depressed position and a control piston urged by said supply pressure of gas to a shut off position whereat said control piston shuts off the flow of gas through said passageway and urges said injector piston to said non-depressed position, and moveable by the movement of said injector piston to said depressed position to an open position whereat said control piston allows the flow of gas through said passageway to said outlet, and a pressure relief valve connected to said passageway at a point in continuous communication with said outlet and wherein said apparatus includes sealing means associated with said cap or said body for providing a seal between said outlet and said injector passage of said cap, wherein said reduction means and said control valve means are for controlling the flow of gas to said outlet and wherein said injector piston is for movement to said depressed position by said cap.

According to another aspect of the present invention, there is provided apparatus for carbonating liquid in a container comprising a cap for said container having an injector passage closed by a one-way non-return valve and a body having an inlet with gas cylinder mounting means for mounting the valved outlet of a cylinder of compressed gas of the type having a pin valve to control the flow of gas from the cylinder, said body having a manually operated piston moveable in a manual piston bore in communication with said inlet of said body for operating said pin valve to control flow of gas from said cylinder through said inlet into said manual piston bore, a pressure chamber including pressure reduction means, said pressure chamber communicating with said manual piston bore and with an outlet int he base of a locating cup at one end of said body, a passageway connecting said pressure chamber to the outside of the said body, a second passageway connecting said pressure chamber to the outside of the body for reception of a pressure gauge to indicate pressure within said body, said locating cup for supporting said container with said outlet in communication with said injector passage of said cap.

Figure 2:
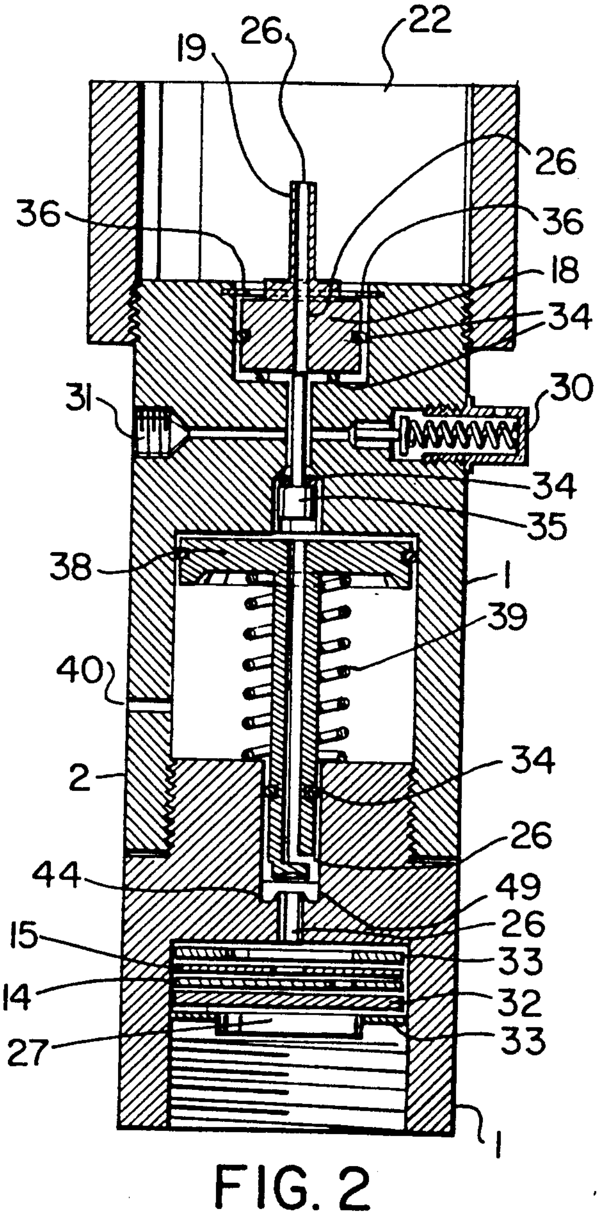
Figure 3:
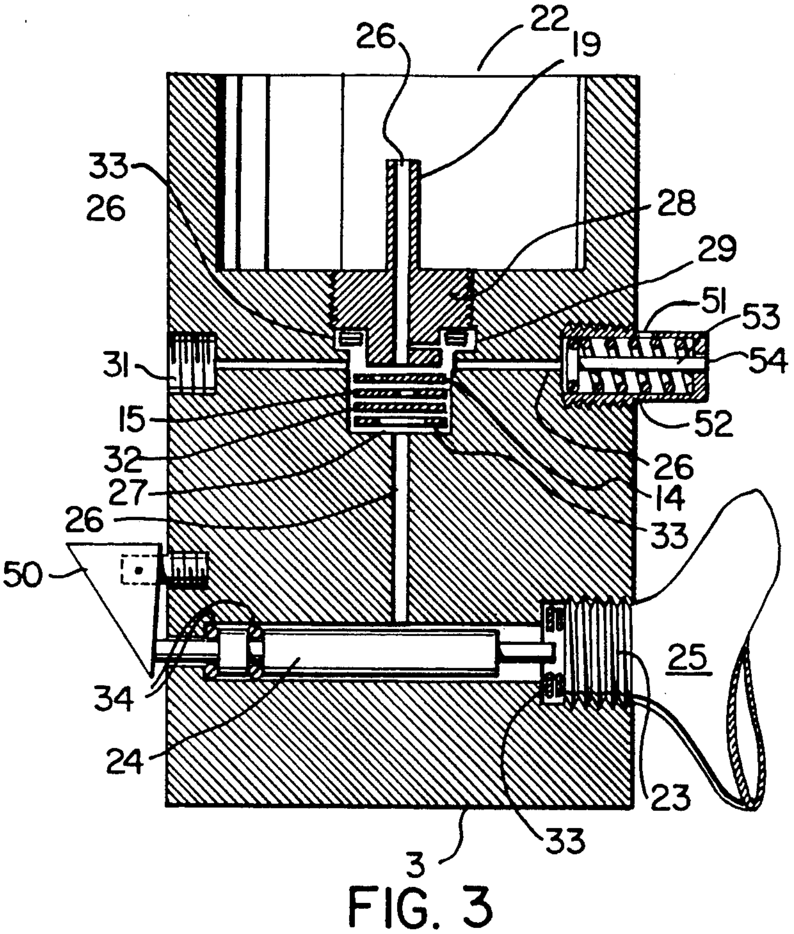
Figure 4A:
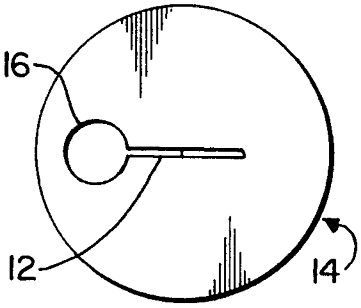
Figure 4B:
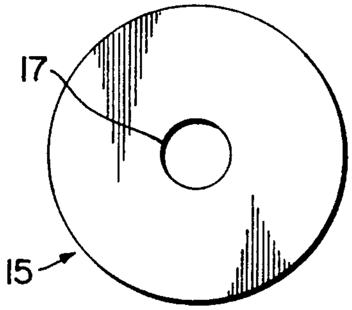
Figure 5:
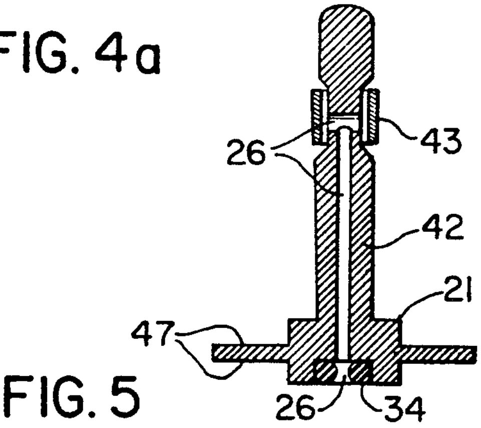
Figure 6:
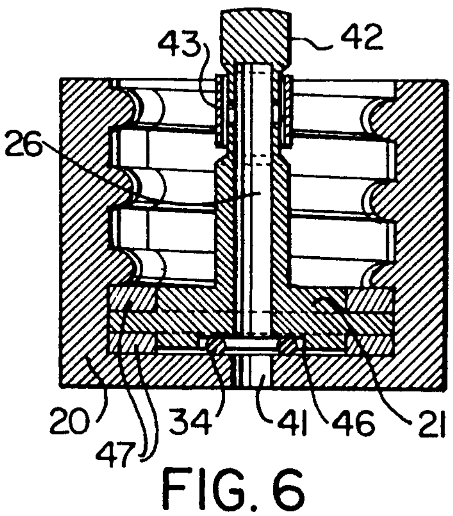
Figure 7:
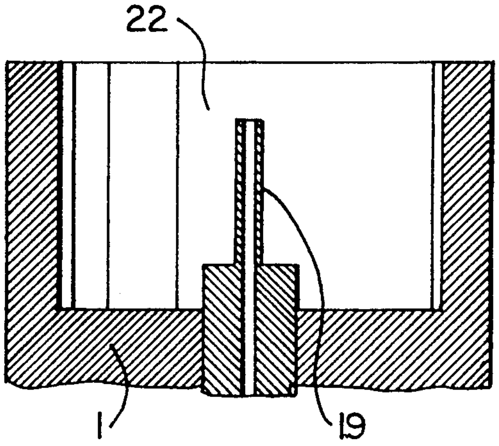
Figure 8:
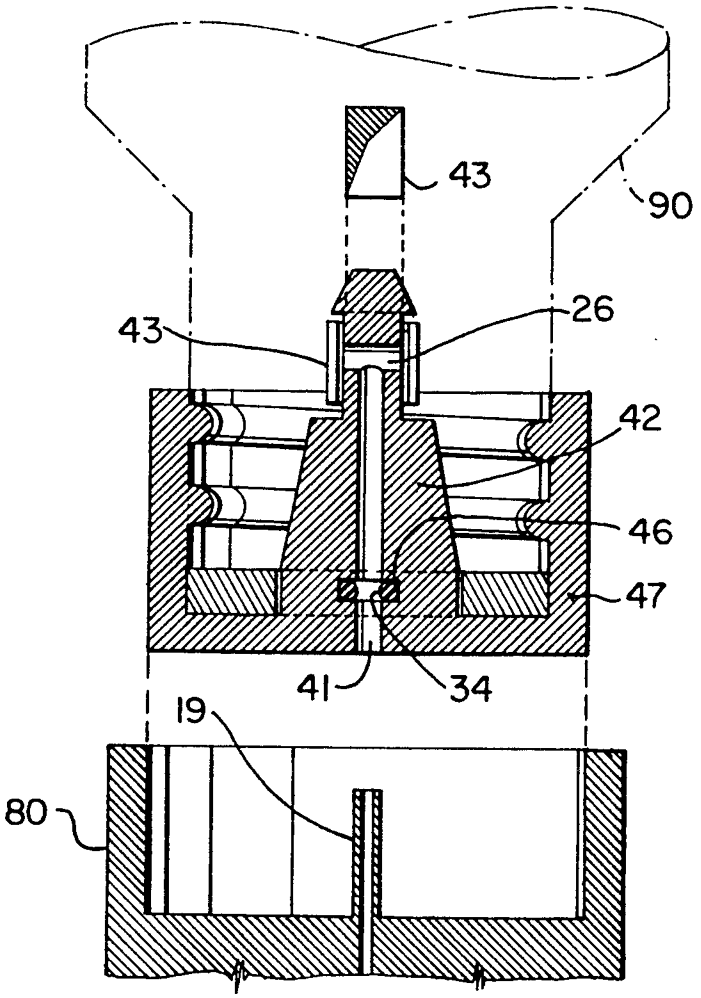
Figure 9:
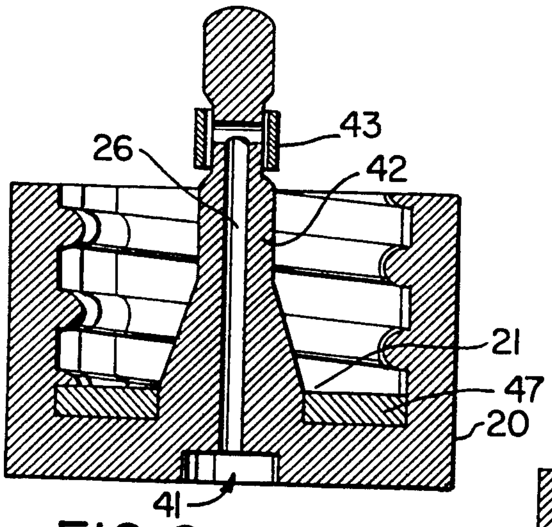
Figure 10:
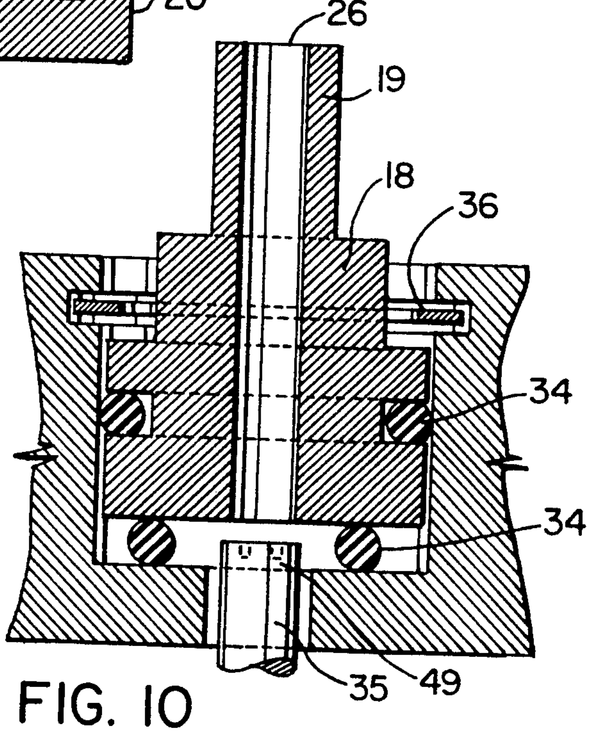
Figure 11A:
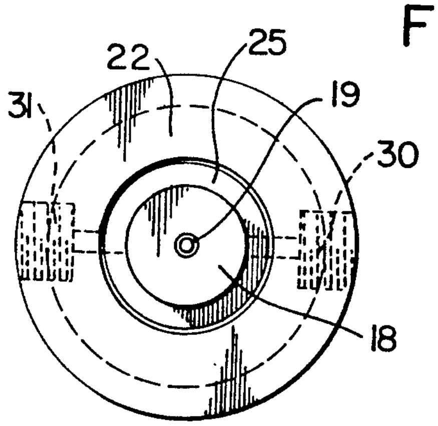
Figure 11B:
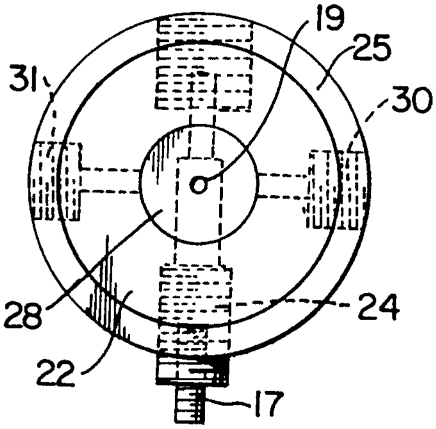

Example embodiments of the present invention will now be described with reference to the accompanying drawings in which:

FIG. 1 illustrates the carbonator attached to a cylinder of compressed carbon dioxide gas, and the P.E.T. bottle which has been inverted, positioned in a locating cup of the carbonator, FIG. 2 is an internal view of the carbonator of FIG. 1, FIG. 3 is an internal view of the carbonator in another preferred form of the invention when the $CO_2$ cylinder is fitted with a pin valve and requires manual control of the gas on/off flow, FIGS. 4*a* and 4*b* illustrate the reduction discs of FIGS. 2 and 3, FIG. 5 illustrates the non-return valve insert which is fitted inside a bottle cap, FIGS. 6 and 7 show the bottle cap and insert above the locating cup of the carbonator, and the cap entering the locating cup, FIGS. 8 and 9 illustrate the non-return valve insert as an integral part of the bottle cap, FIG. 10 details the top injector piston of FIG. 2, and;

FIGS. 11*a* and 11*b* are plan views of the carbonating apparatus of FIGS. 2 and 3, respectively to slow the position of the various openings in the apparatus in relation to each other.

With reference to FIG. 1, the carbonator of one embodiment of this invention is illustrated generally at 80 attached to a $CO_2$ cylinder 25 and an inverted P.E.T. bottle or container 90. Turning next to FIG. 2 and FIG. 11*a*, the carbonating apparatus 80 has a shell 1, FIG. 2, which is in two parts and screws together at 2. The shell 1 has means to accept gas cylinder 25 (which usually contains carbon dioxide under pressure) with a small space above the $CO_2$ cylinder. The filter 32, and the discs 14 & 15 are compressed together between nitrial compression washers 33, in the reduction chamber 27 by tightening the body 1 onto the cylinder 25. Gas entering the system will flow through the reduction discs 14 and 15.

The reduction discs 14 & 15 reduce the flow of gas to a steady stream as it passes through the system and into the liquid, in container 90 which is beneficial in carbonating the liquid as the stream of small bubbles passing up through the liquid gives a greater opportunity to absorb the $CO_2$ than several large bubbles bursting through the liquid. By reference to FIG. 4, it is seen that the reduction discs 14 & 15 have drilled holes 16 and 17, respectively and disc 14 has a groove 12 cut into one face; the drilled hole 17 is situated in the center of disc 15 and the hole 16 to the side of disc 14. The groove 12, cut across the face of disc 14 from the side of the hole 16, runs directly to the center of the disc. The groove is cut to the depth of 5 to 10 thousands of an inch. The reduction valve discs 14 & 15 are placed together with the groove 12 between the two faces, they are then placed in the reduction chamber 27, and compressed together when the carbonator is screwed on to the cylinder. When gas starts to flow into the chamber 27 further pressure is exerted on the discs 14 & 15 by the pressure of the gas coming into the chamber 27, from the cylinder. The gas enters hole 16 of disc 14 and can only pass to hole 17 in disc 15 through the groove 12, which in effect has now become a 5 or 10 thousand of an inch diameter hole; holes 16 and 17 are in close proximity and of a depth of one sixteenth to one eighth of an inch.

The gas flows out of the discs 14 & 15, and around the lower pin section of differential pressure regulating piston 38, and into the central passageway 26, flowing up directly against the base of control piston 35; the flow then pushes control piston 35 into the closed position.

Pressure will then build up above differential pressure regulating piston 38; when the pressure in the space above piston 38 exceeds the ability of spring 39 to resist it, the piston 38 is forced down and closes off the flow of gas when the bottom 49 of the piston 38 closes on aperture 44. Air in the chamber beneath piston 38 breathes at 40.

With reference to FIG. 10 as well as FIG. 2, an injector piston 18 is in communication with the control piston 35 and indirectly with piston 38, and is sited in the base of the locating cup 22, and retained by a circlip 36. The cap for the bottle 90 of FIG. 1 is illustrated in FIGS. 6 and 9 at 20 with a valve support 42 therein. The valve support 42 of the cap 20 of FIG. 6 is a separate insert detailed in FIG. 5, whereas the valve support 42 of FIG. 9 is integral with the cap 20.

When a capped bottle is to be carbonated, it is inverted as illustrated in FIG. 1, and the cap 20 (which may either be of the type illustrated in FIG. 6 or FIG. 9) is directed into the locating cup 22 wherein the cap is correctly positioned for the injector needle 19 to enter through the cap, into the valve support 42, up to the non-return valve 43, and seal on the o-ring 34 in the base of the cap. As the bottle is lowered to the bottom of the locating cup 22, its cap strikes the shoulder of piston 18 pushing it downwards and in turn depressing piston 35, which allows gas to flow past piston 35. The gas route is from the cylinder 25, through filter 32, reducing at discs 14 & 15, upwards, entering passageway 26 in the center of piston 38, around the sides of piston 35, into the narrow section of the pin portion of piston 35 to the base of piston 18 and into passageway 26 of that piston, and passing through the non-return valve 43 in the cap into the sealed bottle. When the bottle is removed from the carbonator, gas pressure within pushes the piston 35 up and seals off the gas flow, at the same time raising the piston 18 to its original position.

In this embodiment of the invention a series of three pistons are used in the carbonating apparatus and are in communication either directly or indirectly with each other. It is piston 18 that enables pistons 35 and 38, each with its own particular contribution, to be linked together in the carbonating apparatus to control $CO_2$ flow and the degree of carbonation given to the beverage. It provides the means, in conjunction with the locating cup 22, to accurately locate the injector needle 19 in the hole in the cap 20 containing the non-return valve A shoulder at the base of the injector 19 determines the depth of entry of the injector into the non-return valve, and acts as a shoulder for the bottle to rest on and depress piston 18 downwards to activate the gas flow Airways are provided at the narrow section of piston 35 and below piston 18 to connect a pressure release valve 30 and a pressure gauge at 31 into the system A preferred form of the present invention has now been described with some possible modifications. However, many other modifications may be made to the apparatus. For example, where the $CO_2$ cylinders available for the domestic market are a smaller type which are controlled by a pin valve (as opposed to the larger cylinders which are controlled by turn valves), a second embodiment of the carbonator described in connection with FIG. 3 and FIG. 11*b* is used.

Turning now to FIG. 3 and FIG. 11*b*, the apparatus is operated by a side lever 50 and accepts a small $CO_2$ cylinder 25 with a pin valve 23 to control on/off gas flow. When the lever 50 is depressed the piston 24 moves forward, the pin valve 23 in the cylinder 25 is opened and gas flows into the passageway 26. Piston 24 fits very closely in the lower passageway 26 and acts as a partial restrictor to the gas flow. The gas flows up into the reduction chamber 27 through the filter 32, then through the reduction discs 14 & 15 (of FIG. 4), entering the injector block 28 which has passageway 29 in one side and a lower portion smaller than the reduction chamber 27 to allow the gas to pass to the pressure release valve 30 and the pressure gauge 31. Gas in the injector block also passes through the injector 19 and into the bottle via the non-return valve 43 of the cap 20 (shown in FIG. 7 and 8). As before, cap 20 may be the single structure of FIG. 9 (and FIG. 8 illustrates this cap association with the carbonator of FIG. 3) or the cap may include the separate insert illustrated in FIG. 5 for the valve support 42 (and FIG. 7 illustrates such a cap 20 in association with the carbonator of FIG. 3).

The pressure gauge is not shown, only the opening 31.

At the top of the apparatus is the cap locating cup 22. When the bottle is inverted and directed into the locating cup 22, the bottle cap fits firmly into the cup 22 and is guided down positively over the injector 19. A seal is made by the o-ring 34 sited in the base of the non-return valve 43.

In this second embodiment of the present invention a carbonating apparatus (FIG. 3) comprises a small shell 3 which has means for attaching a $CO_2$ cylinder 25, a lever 50 to move the piston 24 forward to depress the pin valve 23 of the cylinder to release gas into the carbonator, passageway 26 to direct the gas to reduction chamber 27, a filter 32, and means to reduce the flow of gas to a steady stream rather than a sudden violent burst and passageway 26 to pressure gauge 31 which will indicate pressure in the system. Note that the bottle pressure will be 10 p.s.i. lower than the system as the non-return valve 43 (of FIGS. 7 and 8) requires 10 p.s.i. to open. A passageway connects to a pressure relief valve which acts as an indicator when the correct pressure has been reached and as a safety valve to prevent too high a build up of pressure in the bottle An injector block 28 is sited in the base of the locating cup 22 with a short injector 19 forming part of the block. The locating cup 22 is sited in the top of the apparatus as previously described. The reduction discs 14 & 15 in the second embodiment of the present function the same as in the first embodiment, however, it is not possible to site them in cylinder 25 opening by reason of the movement of the piston 24 against the pin valve 23. In both cases the discs 14 & 15 can easily be removed for cleaning should the groove become blocked by just removing them and parting them. The discs can be placed in the reduction chamber 27 in any order, but the groove 12 must be between the two faces. The groove 12 should be cut from hole 16 in disc 14 to the center of disc 14, the groove will then always locate to the center hole without the need to rotational position the groove, as would be the case if the groove was cut from the center hole 17 in disc 15.

As has been mentioned, in both embodiments the carbonator has an injector needle 19 which will pass through a small hole 41 in the center of the cap 20 of FIG. 6, 7 and 9; the caps 20 are so threaded that they will only fit on to P.E.T. bottles, and are deeper than a normal cap so as to be able to accept the valve support 42. The injector 19 passes through the small hole 41 and into the passageway 26 of the valve support 42. The valve support 42, in its preferred form, will provide means, when the cap 20 is screwed tightly on a P.E.T bottle containing liquid to be carbonated, to permit $CO_2$ to pass into the bottle and remain sealed in the bottle, until the bottle is opened to drink the beverage. The valve support 42 serves a variety of functions; firstly, provision is made for a well 46 to accept an o-ring to seal the injector to prevent loss of gas from around the injector 19, and to provide a seal at that point for the contents of the bottle should there be a leak around the washers 47 A shoulder 21 is preferred to prevent the washers 47 screwing into the bottle when the cap is tightened up—as the top of the P.E.T. bottle is very thin this would otherwise occur frequently. A non-return valve 43, is sited at the top of the valve support 42, this enables drinks to be carbonated with the pre-mix method.

The carbonating apparatus has a cap locating cup 22, which is a cup or well the diameter of the cap 20 and of a depth which accepts the inverted bottle cap into the opening 22. The cap 20 fits closely in the opening so that the bottle is accurately guided onto the injector 19 ensuring a good fit as seen in FIG. 7. The injector block 28 of FIG. 3 is screwed into the base of the locating cup 22. In the FIG. 2 embodiment, the injector piston 18 is sited in the locating cup 22, and is secured by a circlip 36. The locating cup 22 will support an inverted bottle so placed in it. The injector block 28 of FIG. 3 is screwed into the base of the locating cup 22 and does not act as an on/off device as does the injector piston 18 of FIG. 2, but forms part of the reduction chamber, and compresses the reduction discs 14 & 15, otherwise the injector 19 performs as previously mentioned in connection with FIG. 2.

The apparatus of the present invention permits a process using pre-mix carbonation. Premix carbonation means the drink, whether it is a mixture of a syrup and water to make soft drinks or beer, wine, fruit pulp mixes, fruit juices or a mixture of any of them, is carbonated as a whole in a sealed bottle or container. This is in contrast to the post-mix method which produces carbonated water which is then added to the syrup with a loss of carbonation during mixing. For example, with domestic post-mix carbonators that produce carbonated water using an open bottle or container that contains a measure of liquid, a nozzle enters the bottle and is submerged in the liquid and a seal is made between the apparatus and the opening of the bottle to retain pressure in the bottle. At this point the liquid is carbonated, a pressure is built up in the bottle, and carbonated water is produced with reliance placed on the following to effect carbonation: a low temperature, an amount of agitation when the $CO_2$ bubbles through the liquid, and finally, pressure—some carbonators of this type operate with pressures up to 200 p.s.i. When the operating pressure is exceeded it is vented off through a pressure relief valve which is in direct communication with the contents of the bottle; this could result in a loss or waste of $CO_2$. When the bottle is removed from the apparatus, it has $CO_2$ which is under pressure in the bottle, this gas is then released to allow the bottle to be removed from the apparatus, from this point on the drink will lose carbonation, even when capped the drink will give up $CO_2$ to equalize the pressure in the bottle between the drink and the air space left. If this system carbonated with the pre-mix system, the following problem would occur a certain amount of frothing or foaming occurs during carbonation, when the pressure relief valve vents the pressure in the bottle this froth could be, together with moisture laden $CO_2$, carried into the orifices and through the airways to the pressure valve. Since the syrup used to make soft drinks contains a high percentage of sugar, there is a risk of crystallization in the narrow airways or in the pressure relief valve itself and either could become blocked or gummed up.

To permit pre-mix carbonation, the carbonating apparatus of this invention has a pressure relief valve 30 shown in FIGS. 2 and 3, as previously mentioned. This valve is in direct communication with the gas flow or gas pressure from the cylinder 25, as it flows through the passageways 26 to the non-return valve 43 in the bottle. It is not in direct communication with the contents or pressure in the bottle 90 (of FIG. 1), but with the back pressure that is created in the system or passageways 26 before the non-return valve by the pressure inside the bottle. The pressure relief valve will react to relieve pressure within the passageway 26. Recall, however, the pressure in the passageways 26 is higher than the pressure in the bottle by virtue of the non-return valve which requires a 10 p.s.i. to open it to permit gas to flow into the bottle. As the flow of gas in the carbonating apparatus has been reduced by means of the reduction discs 14 & 15 in the reduction chamber 27 of FIGS. 2 and 3, the amount of gas flowing is small and when the pressure reaches a point where the pressure relief valve 30 relieves pressure, it has been found that the following occurs. As the valve 30 has a capacity to relieve a greater volume of gas than is flowing into the system, a pressure drop occurs and the non-return valve 43 seals the bottle 90, gas exits through the pressure relief valve 30 and the flow into the bottle ceases. The pressure relief valve is fitted as a safety feature, its intended use is as an indicator in the second embodiment of the carbonating apparatus shown in FIG. 3. With reference to FIG. 3, when pressure builds up in the carbonating apparatus passageways 26, a pressure is exerted on the piston 52 in the pressure relief valve 30. As pressure increases, the piston stem 53 will protrude from the hole 54 in the valve, this will indicate that a given pressure has been reached, and the user will release the activating lever 50 halting the flow of gas. Should the user continue to pass gas into the system, further pressure will be exerted on the piston 52 (which has an o-ring 34 fitted around the crown) and piston 52 will pass hole 51 so that the gas is vented as with a pressure relief valve. In the first embodiment of the invention shown in FIG. 2, the pressure relief valve 30 is intended solely as a safety device.

The position of the pressure relief valve 30 enables the carbonating apparatus to use the pre-mix method and to be able to carbonate any type of beverage in the bottle as $CO_2$ passing into the bottle will not exit through the valve. By virtue of the pressure relief valve 30 (and the non-return valve 43), after the bottle has had $CO_2$ injected into it, it may be removed from the carbonating apparatus without loss of pressure, and some $CO_2$ will have been absorbed as it bubbled through the liquid. The bottle can now be shaken or agitated and the beverage will absorb most of the $CO_2$ in the bottle; the bottle will soften as the $CO_2$ is absorbed. As with other carbonators the best results are obtained with cold water. The bottle can be placed on the carbonating apparatus again and the beverage carbonated one or more additional times, depending on the degree of carbonation required. However, each injection will become smaller as after each carbonation a certain degree of pressure will remain after the bottle has been agitated.

There are four factors that affect the capacity of a liquid to absorb $CO_2$ One factor is the amount of pressure exerted on the liquid, this factor can be overcome simply by an increase in pressure to drive more $CO_2$ into the liquid. A second factor is the rate of absorption, this depends on either time or agitation: a small amount of agitation will induce a liquid to absorb a given quantity of $CO_2$ in a very short time, the same quantity of $CO_2$ would be absorbed if the liquid was left for several days. The two other factors are temperature and air. Temperature affects the amount of $CO_2$ that a liquid will absorb at a given pressure, for example at a pressure and a temperature of 60° F. the liquid will absorb one volume of $CO_2$, at a temperature of 32° F. at the same pressure the liquid will absorb 1.7 volumes. The lower the temperature the greater the amount of $CO_2$ absorbed. The last factor, air, creates the biggest problem. The large bottling concerns de-aerate their water at considerable expense Air should be removed from the presence of the liquid being carbonated. One part air dissolved in the liquid will keep fifty parts of $CO_2$ out of the solution, producing a poorly carbonated drink and a drink that would be very unstable when poured: a lot of effervescence as it is poured, but little carbonation left in the drink.

At this point three of the factors affecting carbonation have been included into the process, temperature : use cold water or refrigerate all beverages before carbonating, rate of absorption: shake the bottle, pressure: by injecting a quantity of $CO_2$ into the bottle, controlled by the spring 39 in conjunction with piston 38 of FIG. 2 or the spring in the pressure relief valve 30 of FIG. 3. By agitating and giving further injections, a higher level $CO_2$ may be attained. The pressure sequence has been found to climb as follows: first carbonation to 75 p.s.i., agitate to 15 p.s.i.; second to 75 p.s.i., agitate to 25 p.s.i.; third to 75 p.s.i., agitate to 32 p.s.i. or equal to 3.5 volumes of $CO_2$ at 50° F. The last factor is air, the air must be removed from the bottle. If the bottle was agitated and air remained in the bottle, carbonation would be greatly reduced and an unstable beverage would result.

In this preferred form of the invention, the apparatus requires a formula for filling the bottle and a process for eliminating the air in the bottle in order to maximize the results of carbonation (after due steps have been taken in regard to temperature, pressure, and agitation). Based on a one liter bottle (larger or smaller bottles would be multiples of this), fill the bottle with the liquid to be carbonated, or in the case of soft drinks a mixture of the desired syrup and water to a total of 900 cc. This level has been found the most suitable, it provides for a good ratio of liquid filling in a one liter sized bottle, but more important it provides a chamber in the bottle to receive $CO_2$ under pressure. Since most P.E.T. bottles have a total capacity of 1100 cc this gives a chamber of 200 cc to receive $CO_2$ Having filled the bottle to the correct level, the bottle is now lightly capped i.e. not screwed on tight enough to seal. Air can now be removed from the bottle, and this is brought about in the following method. By deforming the bottle by squeezing, the liquid level is raised to the top of the bottle, thus removing the air from the bottle. Holding the lightly capped bottle in one hand, gently squeeze the bottle by applying pressure in the middle of the bottle with the fingers and thumb, this will bring the liquid to the top. As liquid starts to break out or overflow, with the other hand tighten the cap. The air should have been removed, this can be checked by tipping the bottle on its side, if bubbles appear on the side of the bottle, return the bottle to the upright position, loosen the cap slightly and exert a little more pressure to bring the liquid to the top of the bottle. If the liquid is reasonably cold, the beverage can now be carbonated giving it two, three, four or more injections, depending on the type of beverage, and the individual's taste.

Further de-aeration can be carried out by the user, should he desire to obtain even better results, by warming the deformed bottles by placing them in hot water for ten to fifteen minutes after which time a number of bubbles will have formed in the bottle. These bubbles are removed by further deforming or squeezing of the bottle; at this point the liquid would virtually be de-aerated and the air totally removed from the bottle. This second de-aeration is not necessary when the liquid to be carbonated is a previously fermented liquid i.e. beer or wine, as any air in the liquid would have gone during fermentation. The bottle is then refrigerated until required As there is no air remaining in the bottle, there is no possibility of the liquid absorbing air again as the temperature drops. When the liquid is ready for carbonation, the bottle is inverted and lowered into the locating cup 22, as $CO_2$ flows into the bottle and passes through the liquid, some is absorbed by the liquid. The $CO_2$ that is not absorbed begins to build up pressure in the bottle. As pressure increases the bottle reforms back to its original shape, and a pocket of pressurized $CO_2$ forms in the bottle, the bottle is now removed from the carbonator, and can now be shaken to agitate the contents. Most of the $CO_2$ will be absorbed within a few seconds of shaking. The contents can now be re-carbonated until the desired level is reached. The bottle will soften considerably as it is shaken and the pressure drops as the $CO_2$ is absorbed. As will be understood by the present invention and its process, all the $CO_2$ that is injected into the bottle is contained in the bottle, and by agitation induced into the beverage. This is in contrast to all prior normal domestic type carbonators and their procedures wherein when the bottle is removed from the carbonating apparatus, the seal is broken so that the portion of pressurized $CO_2$ in the top of the bottle is released and no benefit is obtained from it. No useful purpose would be served in capping the removed bottle and agitating as there remains no $CO_2$ to be absorbed, rather there would be a loss of carbonation as the beverage would give up $CO_2$ to equalize the pressure between the beverage and the space above it.

The passageways 26 of FIGS. 2 and 3 form an important part of the system and differ from the prior art in as much as they only carry $CO_2$ to the bottle via the non-return valve 43, when the injector needle 19 has entered the cap 20 and a seal is made between the injector needle 19 and the o-ring 34 in the base of the valve support 42. This has the effect of forming a sealed chamber from the gas cylinder 25, through the carbonator, to the non-return valve 43 in the valve support 42. The passageways branch out to make provision for the pressure relief valve 30 and the pressure gauge 31. In contrast, in many prior art devices a seal is made between an open bottle and the carbonating apparatus and gas flows from the supply through tubing to the injecting nozzle which extends into the bottle nearly to the bottom. The gas passes from the injecting nozzle into the liquid, then flows upward, exiting around the nozzle and then through flexible tubing to the pressure relief valve which will relieve pressure when the pressure in the bottle reaches a pre-set level Thus the pressure relief valve functions after the fact in contrast to the present invention wherein it functions before the fact.

Various modifications of the apparatus or process of the invention may be made without departing from the spirit or the scope thereof, and it should be understood that the invention is intended to be limited only as defined in the claims.

The embodiments of the invention in which an exclusive property or privilege is claimed are defined as follows:

1. Apparatus for gasifying liquid in a container comprising a cap for said container having an injector passage closed by a one-way non-return valve in combination with a body having means for mounting a cylinder of pressurized gas of the type having a flow control valve for supplying a flow of gas at supply pressure, said body having reduction means for receiving the gas from said cylinder, a passageway connecting said reduction means to an outlet configured for mating engagement with said injector passage of said cap, a control valve means comprising an injector piston incorporating said outlet and moveable between a non-depressed position and depressed position and a control piston urged by said supply pressure of gas to a shut off position whereat said control piston shuts off the flow of gas through said passageway and urges said injector piston to said non-depressed position, and moveable by the movement of said injector piston to said depressed position to an open position whereat said control piston allows the flow of gas through said passageway to said outlet, and a pressure relief valve connected to said passageway at a point in continuous communication with said outlet and wherein said apparatus includes sealing means associated with said cap or said body for providing a seal between said outlet and said injector passage of said cap, wherein said reduction means and said control valve means are for controlling the flow of gas to said outlet and wherein said injector piston is for movement to said depressed position by said cap.

2. Apparatus as claimed in claim 1 including a differential pressure regulating piston located between said reduction means and said control piston, with a pressure space defined between said control piston and said differential pressure regulating piston, said differential pressure regulating piston having means for allowing the flow of gas from said reduction means to said pressure space and being movable against the loading of spring means to a differential pressure regulating piston shut off position to shut off the flow of gas from said reduction means, wherein pressure in said pressure space urges said control piston to said shut-off position and said differential pressure regulating piston to said differential pressure regulating piston shut off position to shut off the flow of gas, and, on depression of said injector piston, said control piston is moved form said shut-off position to said open position to allow the flow of gas from said pressure space to said outlet means, thereby reducing pressure in said pressure space so that said differential pressure regulating piston is moved by said spring means to allow the flow of gas from said reduction chamber to said pressure space, and wherein on depression of said injector piston, said container and said pressure space are interconnected by back pressure from said container exerted on said one-way non-return valve, such that when pressure in said container increases, said back pressure is increased, and pressure in said pressure space also increases so that said differential pressure regulating piston is urged to said differential pressure regulating piston shut off position when said back pressure exceeds the biasing force of said spring means, and wherein the stroke of the said differential pressure regulating piston is adjustable to alter the pressure at which said differential pressure regulating piston shuts off the flow of gas.

3. Apparatus for carbonating liquid in a container comprising a cap for said container having an injector passage closed by a one-way non-return valve and a body having an inlet with gas cylinder mounting means for mounting the valved outlet of a cylinder of compressed gas of the type having a pin valve to control the flow of gas from the cylinder, said body having a manually operated piston moveable in a manual piston bore in communication with said inlet of said body for operating said pin valve to control flow of gas from said cylinder through said inlet into said manual piston bore, a pressure chamber including pressure reduction means, said pressure chamber communicating with said manual piston bore and with an outlet in the base of a locating cup at one end of said body, a passageway connecting said pressure chamber to the outside of the said body, a second passageway connecting said pressure chamber to the outside of the body for reception of a pressure gauge to indicate pressure within said body, said locating cup for supporting said container with said outlet in communication with said injector passage of said cap.

4. Apparatus as claimed in claim 1 or claim 3, in which said reduction means comprise a pair of discs, each disc having a hole, said holes being connected by a groove formed in one of the said discs, said groove being small in size to reduce flow from one hole to the other.

5. Apparatus as claimed in claim 1 or claim 3, in which a filter is incorporated in said reduction means.

6. Apparatus as claimed in claim 1, in which a pressure gauge is connected to said passageway at a point intermediate of said reduction means and said injector piston.

7. Apparatus as claimed in claim 1 or claim 3, in which said body incorporates a cup for receiving said cap, for locating said cap on said body with said outlet means received in said injector passage, and for providing support for said container when is being gasified.

8. Apparatus as claimed in claim 1 or claim 3, in which said cap includes a valve support member incorporating said injector passage, sealingly received in said cap.

9. The apparatus of claim 1 or claim 3 wherein said container is flexible.

* * * * *